(12) United States Patent
Choi et al.

(10) Patent No.: US 12,030,249 B2
(45) Date of Patent: Jul. 9, 2024

(54) THREE-DIMENSIONAL (3D) PRINTER INCLUDING FLOATING SOLUTION FOR REDUCING RESIN USAGE

(71) Applicant: Lincsolution Co., Ltd., Gyeonggi-do (KR)

(72) Inventors: Keunsik Choi, Seoul (KR); Kangwook Lee, Gyeonggi-do (KR); Seongmin Kang, Gyeonggi-do (KR); Seongsu Yoo, Gyeonggi-do (KR)

(73) Assignee: LINCSOLUTION CO., LTD., Gyeonggi-do (KR)

( * ) Notice: Subject to any disclaimer, the term of this patent is extended or adjusted under 35 U.S.C. 154(b) by 926 days.

(21) Appl. No.: 16/729,126

(22) Filed: Dec. 27, 2019

(65) Prior Publication Data

US 2020/0215752 A1 Jul. 9, 2020

(30) Foreign Application Priority Data

Jan. 9, 2019 (KR) ........................ 10-2019-0002935

(51) Int. Cl.
| | |
|---|---|
| *B29C 64/205* | (2017.01) |
| *B29C 64/124* | (2017.01) |
| *B29C 64/255* | (2017.01) |
| *B29C 64/307* | (2017.01) |
| *B33Y 30/00* | (2015.01) |
| *B33Y 40/00* | (2020.01) |

(52) U.S. Cl.
CPC .......... *B29C 64/255* (2017.08); *B29C 64/205* (2017.08); *B33Y 30/00* (2014.12)

(58) Field of Classification Search
CPC ..... B29C 64/255; B29C 64/205; B29C 64/40; B29C 64/245; B29C 64/30; B29C 64/124; B29C 64/321; B29C 64/165; B33Y 30/00; B33Y 40/00; B33Y 70/00
See application file for complete search history.

(56) References Cited

U.S. PATENT DOCUMENTS

| | | | |
|---|---|---|---|
| 5,922,364 A | 7/1999 | Young, Jr. | |
| 2007/0074659 A1* | 4/2007 | Wahlstrom | B33Y 40/00 118/712 |
| 2010/0310698 A1* | 12/2010 | Klare | B33Y 30/00 425/174.4 |
| 2015/0165678 A1 | 6/2015 | Ding et al. | |

(Continued)

FOREIGN PATENT DOCUMENTS

| | | |
|---|---|---|
| JP | H02303817 | 12/1990 |
| JP | H04223138 | 8/1992 |

(Continued)

*Primary Examiner* — Galen H Hauth
*Assistant Examiner* — Baileigh Kate Darnell
(74) *Attorney, Agent, or Firm* — Hodgson Russ LLP

(57) ABSTRACT

A three-dimensional (3D) printer including a floating solution for reducing resin usage may include a main frame, a water tank disposed inside the main frame, a build platform slidable in a vertical direction along the water tank, an optical assembly disposed at an upper portion of the main frame and irradiating a laser beam to the build platform, resin contained inside the water tank, and the floating solution contained inside the water tank, wherein the floating solution is not mixed with the resin, has a higher density than the resin, and supports the resin.

14 Claims, 19 Drawing Sheets

(56) References Cited

U.S. PATENT DOCUMENTS

| | | | | |
|---|---|---|---|---|
| 2015/0224710 | A1* | 8/2015 | El-Siblani | B29C 64/40 |
| | | | | 425/150 |
| 2017/0057177 | A1* | 3/2017 | Ferguson | B33Y 30/00 |
| 2017/0297264 | A1* | 10/2017 | Linnell | B29C 64/129 |
| 2020/0171740 | A1* | 6/2020 | Boydston | C08G 59/24 |
| 2021/0162656 | A1* | 6/2021 | Beh | B29C 64/129 |

FOREIGN PATENT DOCUMENTS

| | | |
|---|---|---|
| JP | H04241929 | 8/1992 |
| JP | H08309864 | 11/1996 |
| JP | H09201877 | 8/1997 |
| KR | 20160135551 | 11/2016 |
| KR | 20160149444 | 12/2016 |
| KR | 101891699 | 8/2018 |
| WO | 2016053512 | 4/2016 |
| WO | 2018182536 | 10/2018 |

* cited by examiner

THREE-DIMENSIONAL (3D) PRINTER INCLUDING FLOATING SOLUTION FOR REDUCING RESIN USAGE

STATEMENT REGARDING FOREIGN GOVERNMENT RIGHTS

This invention was made with Korean government support under Project No. 1415163126 (Research Program: Development of interior and exterior plastic parts manufacturing technology of future cars using ultra-fast large-area 3D printing) support awarded by Ministry of Science and ICT (Research management institution: National Research Foundation of Korea (NRF)).

This invention was made with Korean government support under Project No. 2017M3D1A1040834 (Research Program: Creative Materials Discovery Program) support awarded by Ministry of Science and ICT (Research management institution: National Research Foundation of Korea (NRF)).

This invention was made with Korean government support under Project No. 2019M3F3A1A010747453 (Research Program: Multi-Value Logic Device Integration Process and Architecture Platform Research) support awarded by Ministry of Science and ICT (Research management institution: National Research Foundation of Korea (NRF)).

This invention was made with Korean government support under Project No. IITP-2019-2011-1-00783 (Research Program: Information Technology Research Center support Program) support awarded by Ministry of Science and ICT (Research management institution: Institute for Information & Communications Technology Planning & Evaluation (IITP)).

CROSS-REFERENCE TO RELATED APPLICATION(S)

This application claims the benefit of Korean Patent Application No. 10-2019-0002935, filed on Jan. 9, 2019, in the Korean Intellectual Property Office, the entire disclosure of which is incorporated herein by reference.

BACKGROUND

1. Field of the Invention

Example embodiments relate a three-dimensional (3D) printer including a floating solution for reducing resin usage.

2. Description of the Related Art

A three-dimensional (3D) printer uses photocurable resin as an output material. The photocurable resin is a kind of plastic that is usually in a liquid state like water, but hardens when being exposed to a special light such as a laser. In other words, the scheme is a scheme of curing the photocurable resin through the laser output from a laser and a scanner, and repeatedly forming a three-dimensional (3D) shape.

An existing 3D printer outputs the 3D shape while performing a curing process in a state in which the resin is fully filled in a water tank. The larger the area, the greater the amount of resin required, and thus, a cost of the resin for an initial operation is very high. In fact, only a surface portion of the resin in the water tank is used for actual printing. In addition, when it is desired to use different types of resin, all the resin inside the water tank should be replaced. In the 3D printer, there is a need for a technique for reducing the initial operation cost, use cost, and the like.

The background art described above is possessed or acquired by the inventor in the process of deriving the present disclosure, and is not necessarily a publicly known technique disclosed to the public before the application of the present disclosure.

SUMMARY

An aspect provides a three-dimensional (3D) printer in which most of inside of a water tank is filled with a floating solution, which is not mixed with resin and denser than the resin, thereby dramatically reducing initial operation cost and use cost.

According to an aspect, there is provided an 3D printer including a floating solution for reducing resin usage including a main frame, a water tank disposed inside the main frame, a build platform slidable in a vertical direction along the water tank, an optical assembly disposed at an upper portion of the main frame and irradiating a laser beam to the build platform, resin contained inside the water tank, and the floating solution contained inside the water tank, wherein the floating solution is not mixed with the resin, has a higher density than the resin, and supports the resin.

The build platform may slide in the vertical direction to pass through an interface between the resin and the floating solution, and the resin and the floating solution may be separated from each other by gravity.

The floating solution may contain salt or glycerin.

The floating solution may contain equal to or more than 99% by weight of the glycerin, and the floating solution may be contained inside the water tank in a state in which defoamation of the floating solution is completed.

The floating solution may be contained inside the water tank in the state in which the defoamation of the floating solution is completed.

The 3D printer may further include a re-coater for discharging the resin onto the build platform, and a re-coater driver coupled to the main frame for driving the re-coater in a horizontal direction.

The re-coater may include a re-coater body having a columnar hollow space defined in the re-coater body, and a wind cover connected to the re-coater body, and reducing influence of air acting on the resin discharged from the re-coater body.

The re-coater may further include guide plates respectively installed at both ends of the re-coater body in a width direction of the re-coater body, wherein the guide plates prevent the resin discharged from the re-coater body from deviating from the re-coater body in the width direction of the re-coater body.

A relative position of the re-coater may be adjustable relative to the re-coater driver.

The re-coater driver may include a plurality of re-coater fixing portions provided to fix the re-coater, and the re-coater may be connected to at least one of the plurality of re-coater fixing portions.

An angle between the re-coater and the re-coater driver may be adjustable.

The re-coater may further include a re-coater shield connected to the re-coater body so as to be adjustable in position, and for setting a magnitude of a width of the columnar hollow space of the re-coater body.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1A:
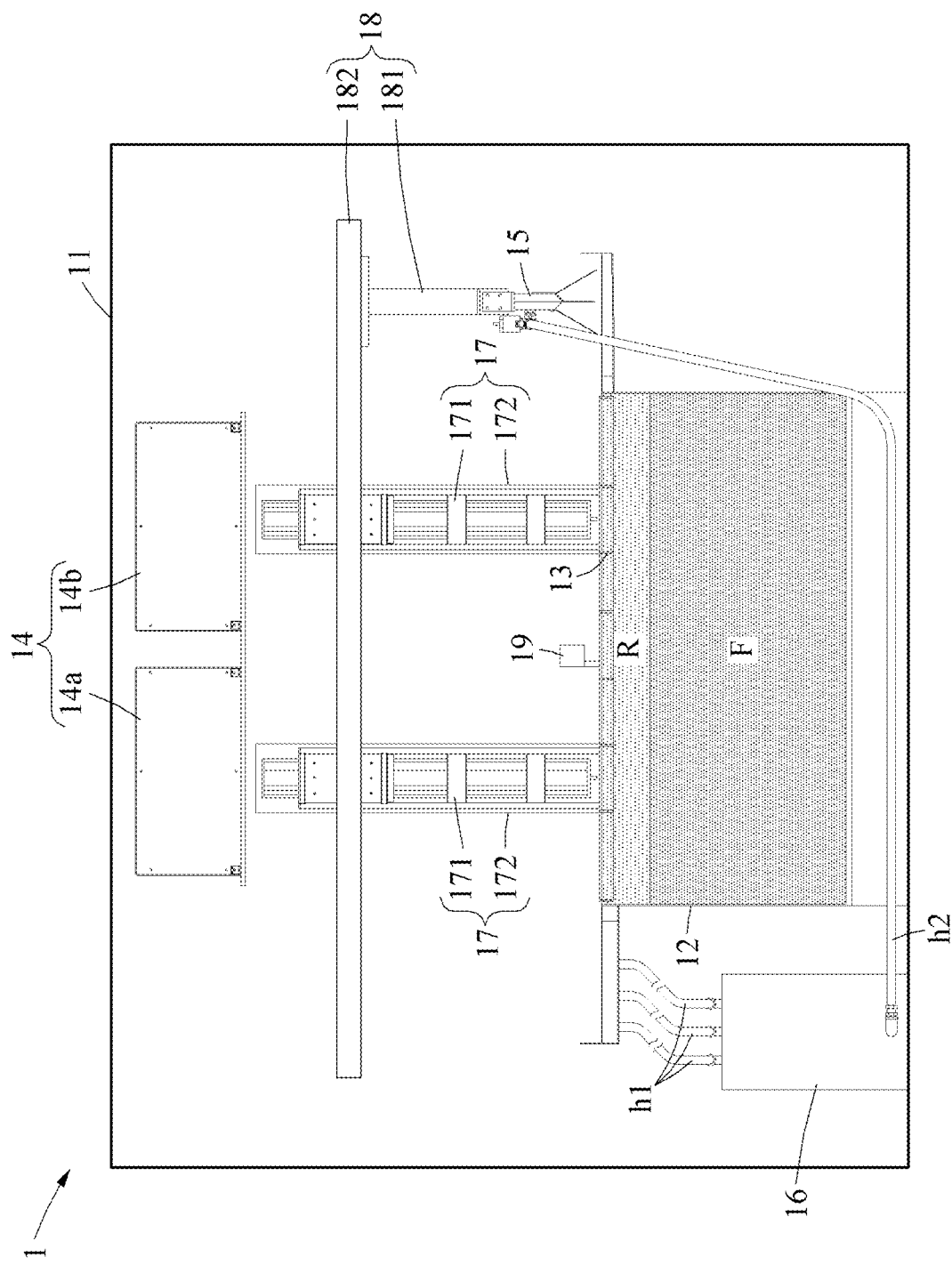
FIG. 1A is a view schematically illustrating a three-dimensional (3D) printer according to one embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. It should be noted that when it is described in the specification that one component is "connected," "coupled" or "joined" to another component, a third component may be "connected," "coupled," and "joined" between the first and second components, although the first component may be directly connected, coupled or joined to the second component.

A component having a function common to a component included in one embodiment will be described using the same name in other embodiments. Unless otherwise defined, the description of one embodiment may be applied to other embodiments, and detailed descriptions thereof will be omitted in the overlapping range.

Figure 1B:
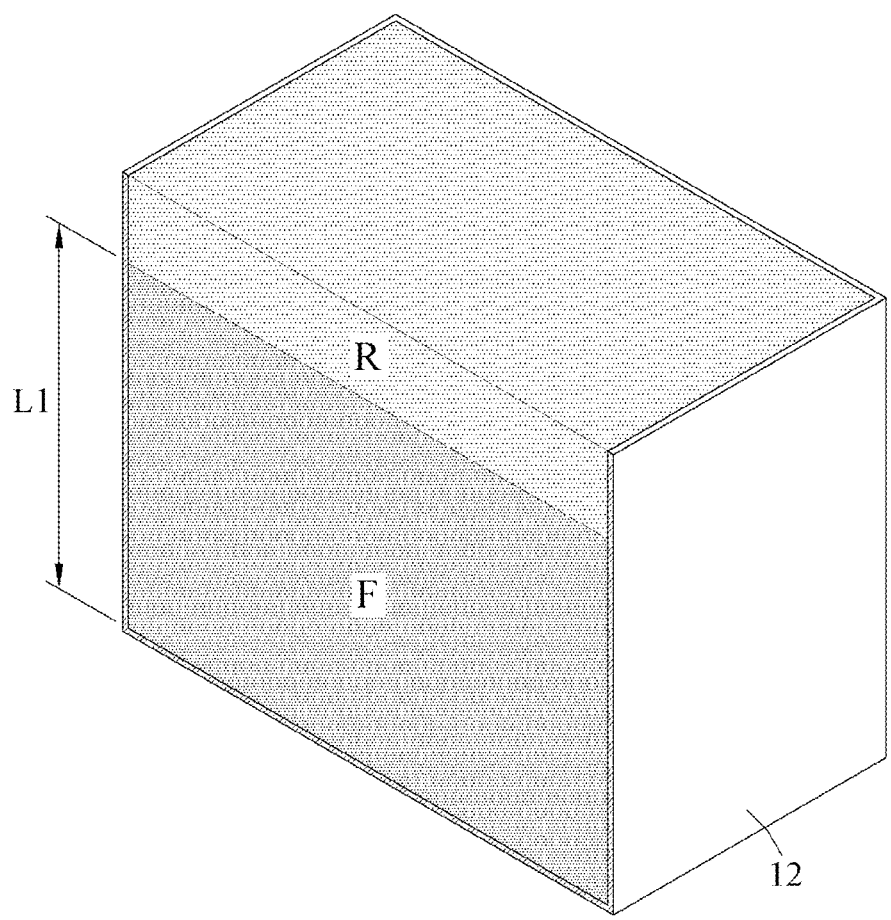
FIG. 1B is a cross-sectional perspective view illustrating a state in which resin and floating solution are provided inside a water tank according to one embodiment.
Figure 1C:
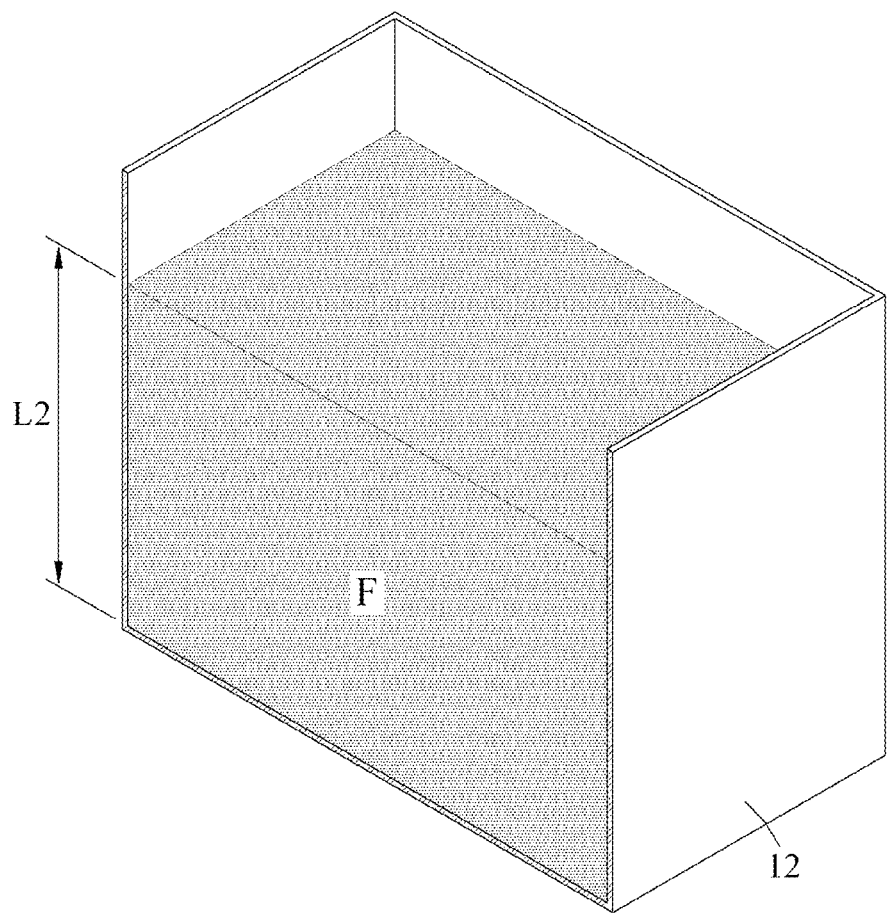
FIG. 1C is a cross-sectional perspective view illustrating a state in which resin and an upper portion of floating solution are removed from inside of a water tank according to one embodiment to outside.

FIG. 1A is a view schematically illustrating a three-dimensional (3D) printer according to one embodiment. Further, FIG. 1B is a cross-sectional perspective view illustrating a state in which resin and floating solution are provided inside a water tank according to one embodiment. FIG. 1C is a cross-sectional perspective view illustrating a state in which resin and an upper portion of floating solution are removed from inside of a water tank according to one embodiment to outside.

Figure 2:
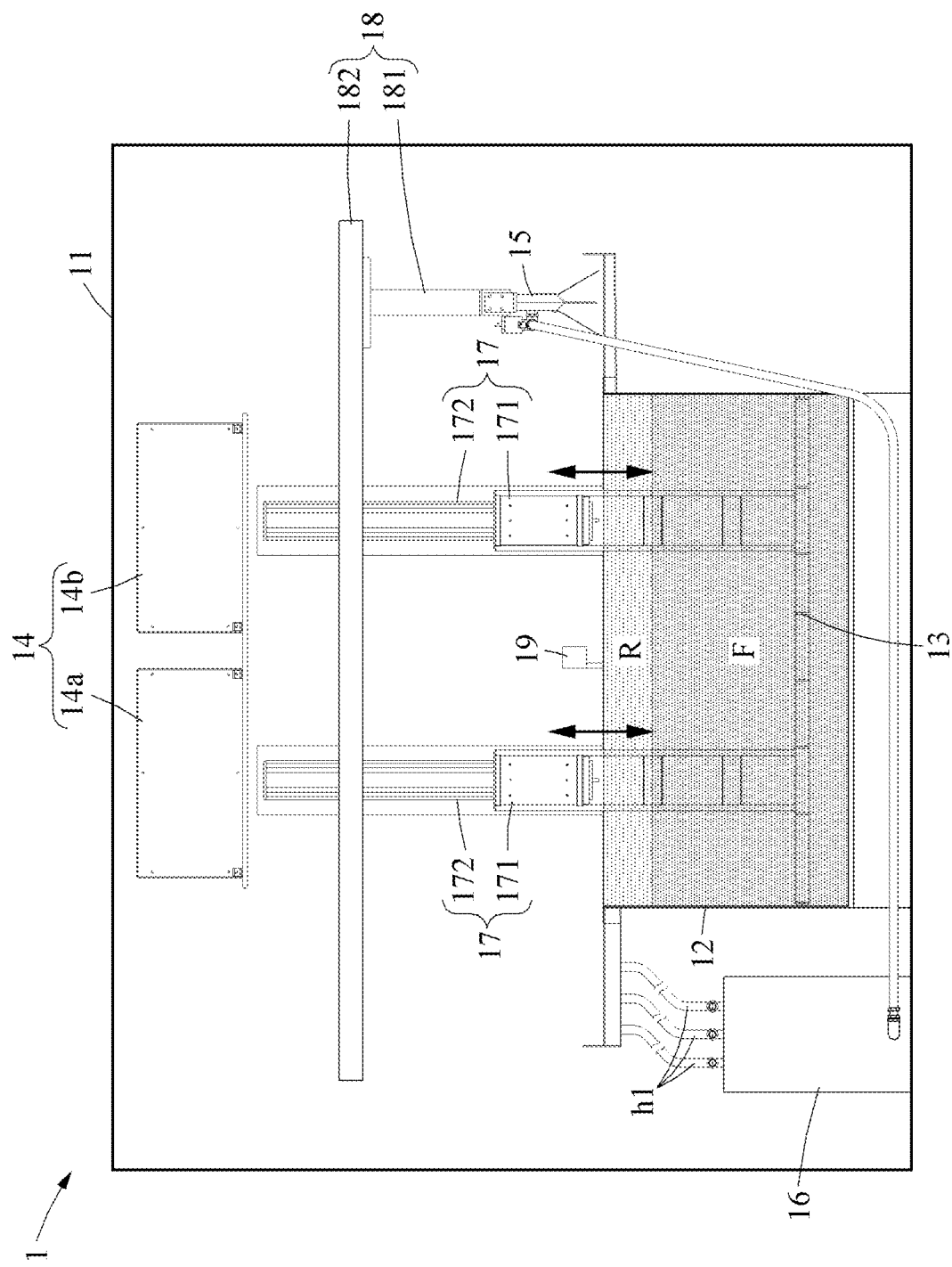
FIG. 2 is a view schematically illustrating a state in which a re-coater of an 3D printer according to one embodiment moves in a horizontal direction.
Figure 3:
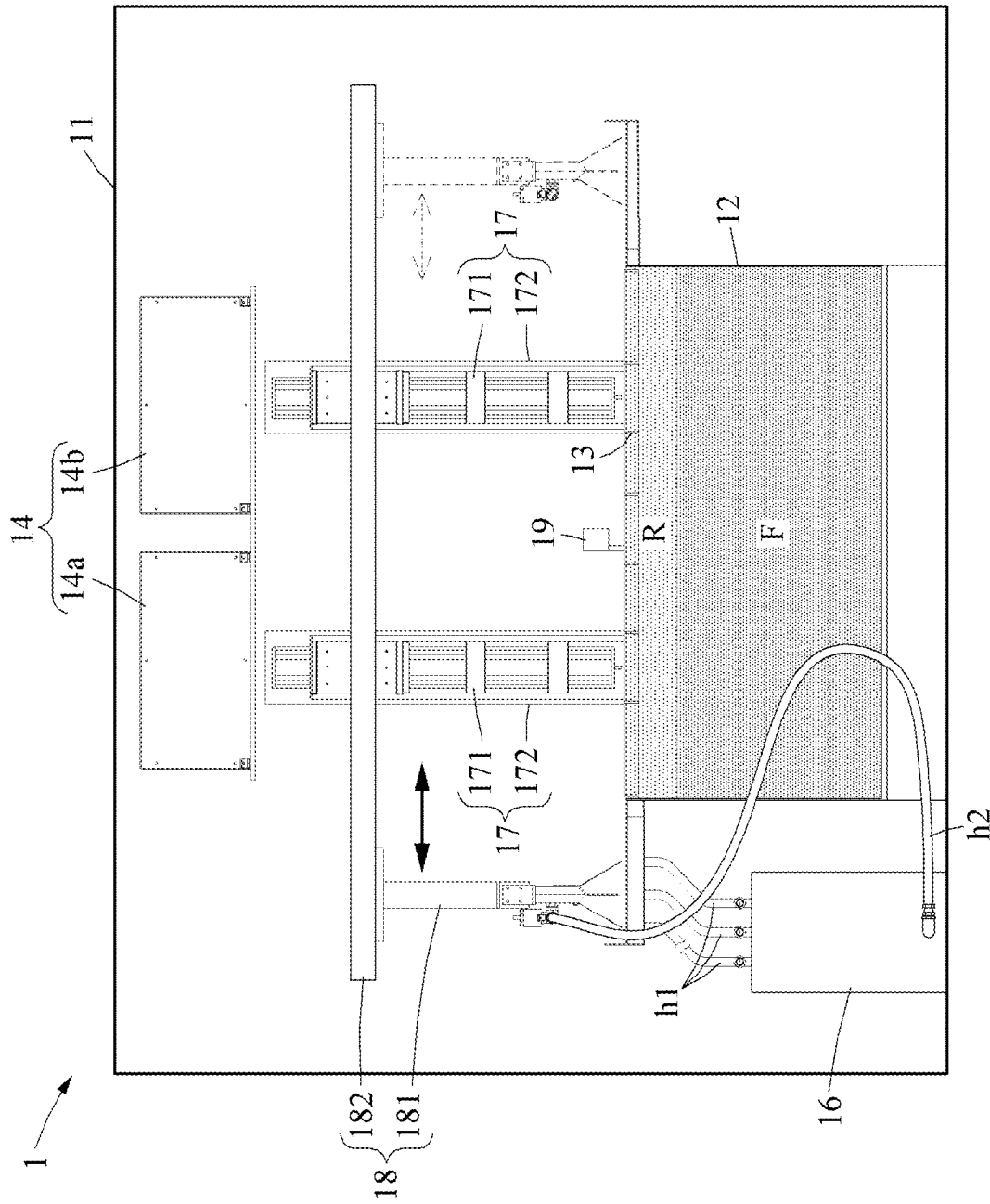
FIG. 3 is a view schematically illustrating a state in which a build platform of an 3D printer according to one embodiment moves in a vertical direction.
Figure 4:
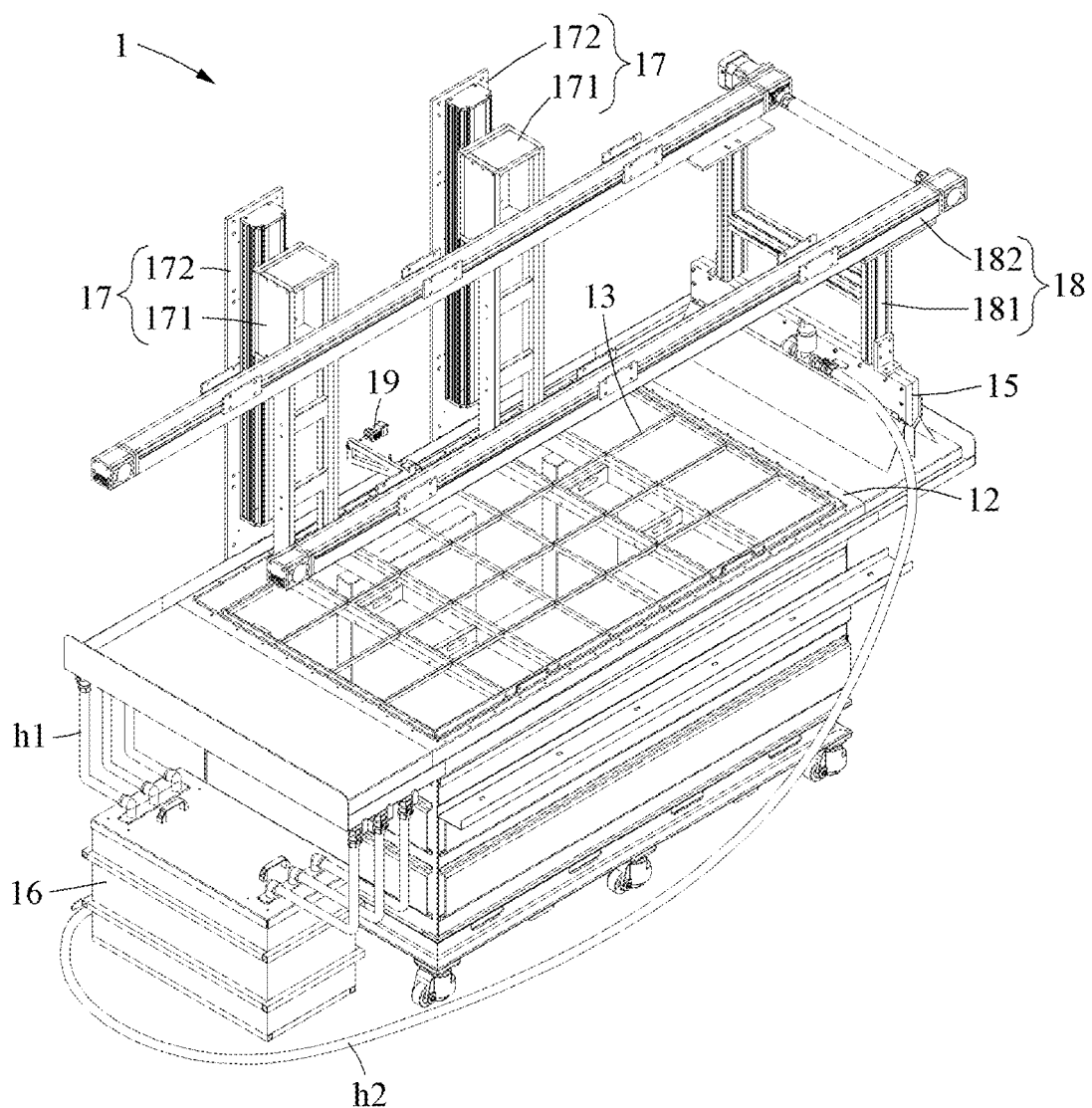
FIG. 4 is a perspective view illustrating an 3D printer according to one embodiment.

FIG. 2 is a view schematically illustrating a state in which a re-coater of an 3D printer according to one embodiment moves in a horizontal direction. Further, FIG. 3 is a view schematically illustrating a state in which a build platform of an 3D printer according to one embodiment moves in a vertical direction. Further, FIG. 4 is a perspective view illustrating an 3D printer according to one embodiment. In FIG. 4, for convenience of description, a main frame 11 and an optical assembly 14 are omitted.

Referring to FIGS. 1A to 4, an 3D printer 1 according to an embodiment may produce a desired output by irradiating a laser beam onto a photocurable resin (hereinafter, referred to as "resin") to cure the resin. The 3D printer 1 may include the main frame 11, a water tank 12, a build platform 13, the optical assembly 14, a re-coater 15, a resin supplier 16, a build platform driver 17, a re-coater drive 18, a level sensor 19, resin R, and floating solution F.

The main frame 11 may support parts of the 3D printer 1, for example, the water tank 12, the optical assembly 14, the resin supplier 16, the build platform driver 17, the re-coater driver 18, and the level sensor 19. The main frame 11 may have an ultraviolet ray blocking coating film (not shown) formed along an outer face thereof, and the ultraviolet ray blocking coating film may block the ultraviolet ray from outside to prevent a damage of the resin.

The water tank 12 may carry the resin R and the floating solution F. The water tank 12 may have a hollow defined therein. For example, the water tank 12 may have a shape of a column with an open top disposed inside the main frame 11. For example, the water tank 12 may have a square columnar shape. The water tank 12 may be detachably connected to the main frame 11. When the resin R carried in the water tank 12 is reduced equal to or below a certain amount, a user may separate the water tank 12 from the main frame 11, and replenish the resin.

The water tank 12 contains the floating solution F as well as the resin R. For example, a most of an internal space of the water tank 12 may be filled with the floating solution F, and only a top of the water tank 12 may be filled with the resin R. The floating solution F may be located semi-permanently in the water tank 12. The resin R may be replaced freely while the floating solution F is maintained intactly. For example, a type of the resin R may vary depending on a product to be produced using the 3D printer 1. The user may remove the existing resin R from the water tank 12 and replenish the new resin R. At this time, the floating solution F may be maintained in the water tank 12 intactly.

The floating solution F is contained inside the water tank 12. The floating solution F may be semi-permanently located in the water tank 12, but may be removed from the water tank 12 as necessary, for example, when the 3D printer 1 is transferred. The floating solution F may not be mixed with the resin R, and may be denser than resin R. Thus, the floating solution F may support the resin R. For example, a bottom face of the resin R may be in contact with a top face of the floating solution F. When the build platform 13 passes through an interface between the resin R and the floating solution F, the resin R and the floating solution F may be temporarily mixed with each other in part, but the floating solution F may be located below resin R again by gravity.

For example, the floating solution F may have a higher viscosity than the resin R. The floating solution F may be shaken while the build platform 13 is driven in the floating solution F. When the floating solution F has the high viscosity, a shaking degree of the floating solution F may become small, and a shaking degree of the resin R may also become small. The viscosity of the floating solution F may be lower than a viscosity that limits sliding of the build platform 13.

The floating solution F may have a higher density than the resin R used. In addition, the floating solution F may have the higher viscosity than the resin R used. The floating solution F may be contained inside the water tank 12 in a state in which defoamation has completed. For example, when the floating solution F supports the resin R in a state in which the defoamation thereof has not completed, and when the temporary mixing of the floating solution F and the resin R occurs, for example, when the build platform 13 passes through the interface between the floating solution F and the resin R, a portion of the resin R may flow into bubbles in the floating solution F. To prevent such risk, the floating solution F may be contained inside the water tank 12 in the state in which the defoamation has completed.

The build platform 13 is slidable in a vertical direction along the water tank 12. The build platform 13 may support the resin to be cured. The build platform 13 may be stopped in a state of being lowered from a surface of the resin carried in the water tank 12 by a certain distance. Then, resin curing may proceed. After resin curing of a corresponding layer is completed, the build platform 13 may be lowered by the certain distance again. When it is identified that the build platform 13 is lowered the certain distance from the resin surface, the resin curing may be performed. The output is produced by repeating such steps.

The build platform 13 may have a grid shape, as shown in FIG. 4. As the build platform 13 descends, the resin may flow between the grids. A size of the grid of the build platform 13 may be determined based on a size of the output to be produced by the user. For example, when it is desired to produce a relatively small output, the build platform 13 with a relatively small grid may be used. Further, when it is desired to produce a relatively large output, the build platform 13 with a relatively large grid may be used.

The optical assembly 14 may be disposed at an upper portion of the main frame 11 to irradiate a laser beam to the build platform 13. The optical assembly 14 may include a light source (not shown), a plurality of relay lenses (not shown), and a collimator (not shown). The optical assembly 14 may adjust a diameter of the laser beam irradiated to the build platform 13. For example, while producing a portion, such as an outer shape of the output, that is, a boundary of the output, which requires precise work, the optical assembly 14 may perform the precise work by adjusting the diameter of the laser beam to be small. Further, while working on an internal portion of the output that does not relatively require a degree of precision, the optical assembly 14 may rapidly perform the work by adjusting the diameter of the laser beam to be large. For example, the diameter of the laser beam may vary in a range of about 0.2 to 0.8 mm.

The optical assembly 14 may include a plurality of optical modules. For example, the optical assembly 14 may include a first optical module 14a and a second optical module 14b disposed side by side at the upper portion of the main frame 11. Each of the first optical module 14a and the second optical module 14b may include a light source, a plurality of relay lenses, and a collimator. A production speed of the output may be increased in proportion to the number of optical modules of the optical assembly 14.

The re-coater 15 may discharge the resin onto the build platform 13 while sliding in a horizontal direction along the main frame 11. The re-coater 15 may assist in lifting the resin onto the build platform 13 in a flat manner. For example, when the build platform 13 descends along the water tank 12, a vacant space may occur on the build platform 13 due to surface tension and viscosity of the resin stored in the water tank 12. The re-coater 15 may discharge the resin into the vacant space.

The resin supplier 16 may supply the resin received from the water tank 12 to the re-coater 15. For example, a pump (not shown) for supplying the resin to the resin supplier 16 may be provided below the water tank 12. The resin may flow along a first hose h1 from the water tank 12 to the resin supplier 16. The resin may also flow along a second hose h2 from the resin supplier 16 to the re-coater 15.

The resin supplier 16 may continuously supply the resin to the re-coater 15, so that the re-coater 15 may be slid away from the water tank 12. For example, the re-coater 15 may slide in the horizontal direction while being kept spaced apart from the water tank 12 by about 20 to 30 cm. In addition, the re-coater 15 is slidable at a high speed of about 0.7 to 1.2 m/s.

The build platform driver 17 may be connected to the main frame 11 and may drive the build platform 13 in the vertical direction. For example, as shown in FIG. 2, the build platform driver 17 may include a support frame 171 for supporting the build platform 13, a platform guide 172 for guiding a movement of the support frame 171, and a drive motor (not shown) for transmitting power to the support frame 171 and/or the platform guide 172. For example, the support frame 171 and the platform guide 172 may be driven in a ball screw scheme. A plurality of build platform drivers 17 may be included in a longitudinal direction to stably support the build platform 13. For example, FIG. 2 schematically shows the 3D printer with the two build platform drivers 17.

The re-coater driver 18 may be connected to the main frame 11 and may drive the re-coater 15 in the horizontal direction. For example, as shown in FIG. 3, the re-coater driver 18 may include a re-coater holder 181 for supporting the re-coater, a re-coater guide 182 for guiding a movement of the re-coater holder 181, and a drive motor (not shown) for transmitting power to the re-coater holder 181 and/or the re-coater guide 182. For example, the re-coater holder 181 and the re-coater guide 182 may be driven in a ball screw scheme.

Since the re-coater 15 is not directly connected to the main frame 11, and is connected to the re-coater driver 18, a magnitude of vibration, which occurs when the re-coater 15 moves, and is transferred to the water tank 12 and the optical assembly 14, may be reduced.

The level sensor 19 may sense a level of the resin on the build platform 13. For example, the level sensor 19 may sense whether the resin is flat on the build platform 13, a thickness of the resin on the build platform 13, and the like. Based on a flatness of the resin measured by the level sensor 19, the build platform driver 17 may determine whether to drive the build platform 13. Similarly, the re-coater driver 18 may determine whether to drive the re-coater 15.

Most of the internal space of the water tank 12 may be filled with the floating solution F, and a portion (top) of the internal space of the water tank 12 may be filled with the resin R. The floating solution F contained inside the water tank 12 may support the resin R. Since the floating solution F is contained semi-permanently inside the water tank 12, the 3D printer 1 may implement 3D printing with only a small amount of the resin R.

In addition, when changing the type of the resin R, the user may remove the resin R contained inside the water tank 12 from inside of the water tank 12 to the outside. At this time, the user may remove the resin R from the inside of the water tank 12 to the outside together with a portion of the floating solution F to definitely remove the resin R remaining at the interface between the resin R and the floating solution F. FIG. 1B illustrates a state in which the resin R and the floating solution F are contained inside the water tank 12. In this connection, a level of the floating solution F is L1. FIG. 1C illustrates a state in which a portion of the floating solution F is removed from the water tank 12 together with the resin R. In this connection, the level of the floating solution F is L2. As an amount of the floating solution F decreases, L2 may be lower than L1.

Figure 5:
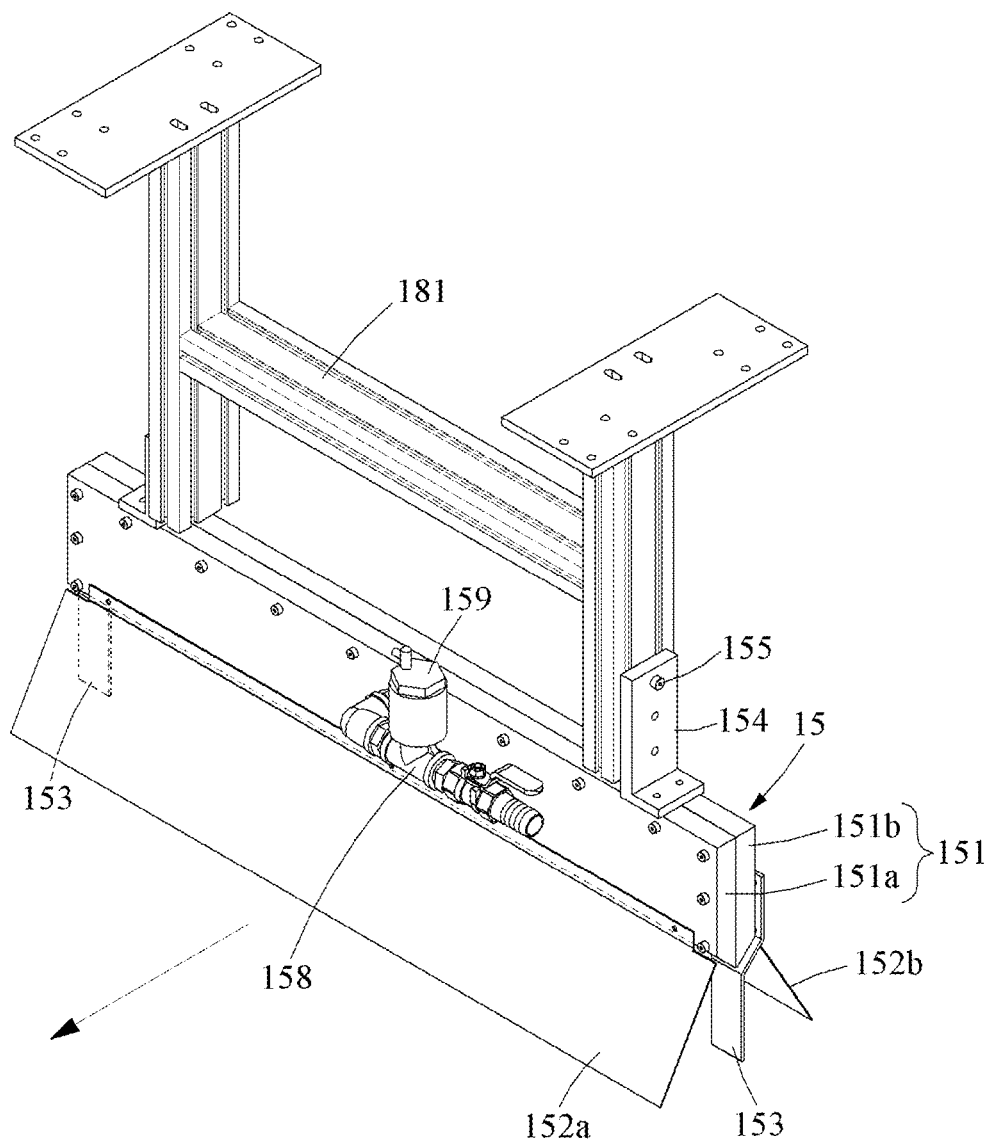
FIG. 5 is a perspective view illustrating a re-coater according to one embodiment.
Figure 6A:
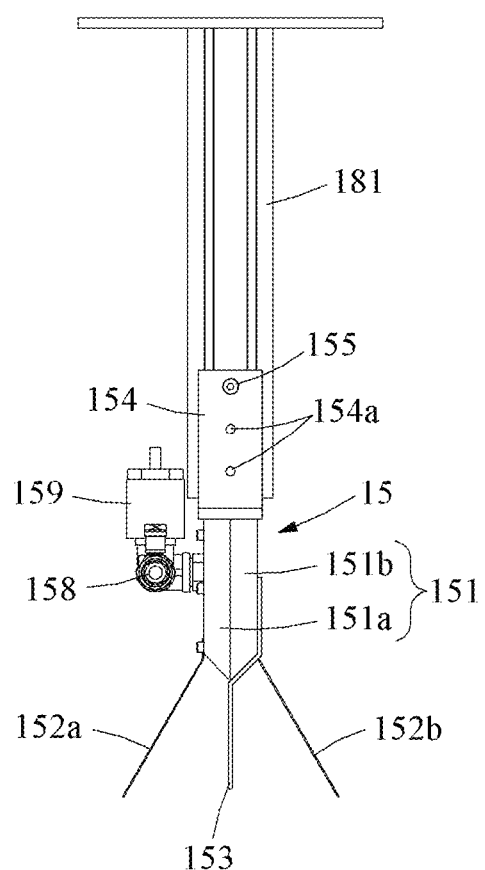
FIGS. 6A to 6C are side views illustrating a re-coater according to one embodiment.
Figure 6B:
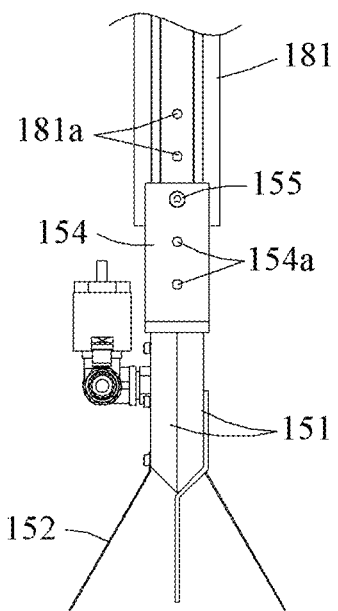
Figure 6C:
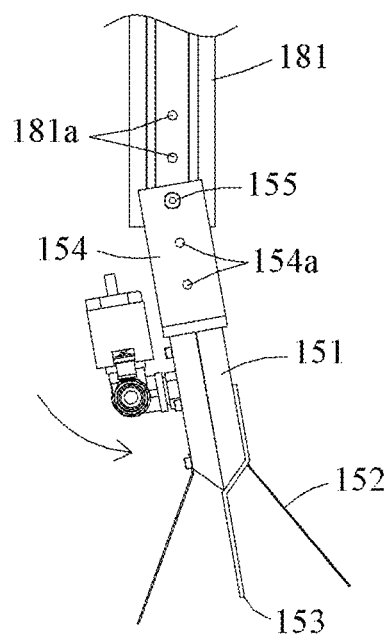

FIG. 5 is a perspective view illustrating a re-coater according to one embodiment. Further, FIGS. 6A to 6C are side views illustrating a re-coater according to one embodiment. Further, FIG. 7 is a cross-sectional view illustrating a re-coater according to one embodiment.

Figure 7:
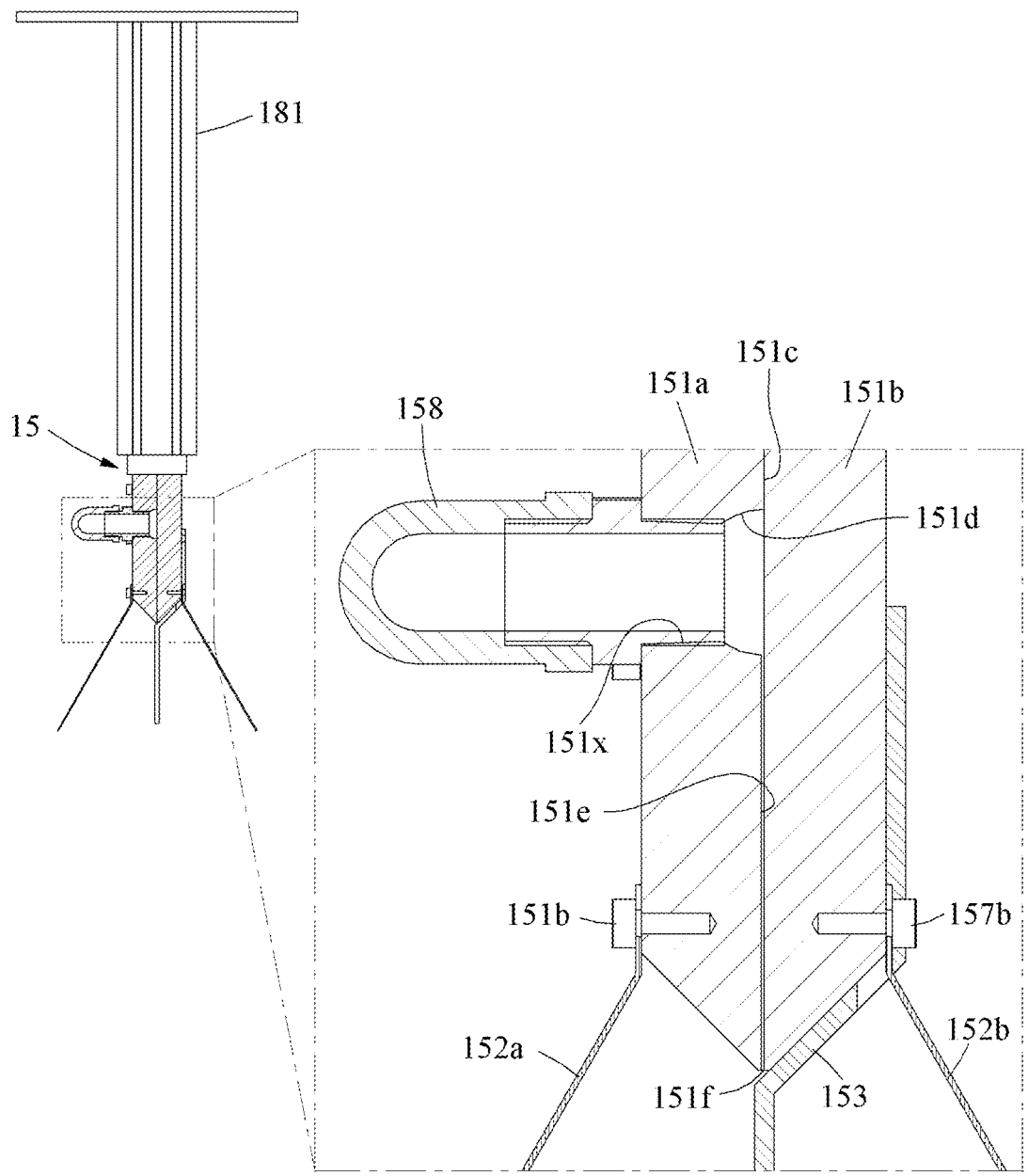
FIG. 7 is a cross-sectional view illustrating a re-coater according to one embodiment.

Referring to FIGS. 5 to 7, the re-coater 15 according to an embodiment may include a re-coater body 151, a wind cover 152, a guide plate 153, a re-coater head 154, a re-coater valve 158 and an air extraction valve 159.

The re-coater valve 158 may be a valve that receives the resin from the resin supplier 16 and delivers the resin to the re-coater body 151. One end of the re-coater valve 158 may be connected to the second hose h2 (see FIG. 4), and the other end thereof may be connected to the re-coater body 151.

The air extraction valve 159 may be disposed at one side of the re-coater valve 158 and may remove air supplied to the re-coater body 151. The air extraction valve 159 may assist a resin flow shape to be stably formed by removing air contained in the resin. In addition, the air extraction valve 159 may reduce the bubbles formed in the resin discharged on the build platform 13.

The re-coater body 151 may discharge the resin supplied from the resin supplier 16 to the build platform 13. The re-coater body 151 may include a columnar hollow space defined therein for receiving the resin supplied from the resin supplier 16 therein. For example, the re-coater body 151 may include a first sub body 151*a* and a second sub body 151*b*. The first sub body 151*a* and the second sub body 151*b* may be connected to each other to form the re-coater body 151. The first sub body 151*a* may include a columnar hollow space 151*d*, for example, a semi-cylindrical hollow space defined therein. The first sub body 151*a* may be connected to the second sub body 151*b* such that the columnar hollow space 151*d* faces the second sub body 151*b*. In this case, the first sub body 151*a* and the second sub body 151*b* may include a columnar hollow space defined therein.

The first sub body 151*a* may include a first portion 151*c* in contact with the second sub body 151*b* and a second portion 151*e*, the columnar hollow space 151*d*, and a second portion 151*e* spaced apart from the second sub body 151*b* by a certain distance, based on a state in which the first sub body 151*a* and the second sub body 151*b* are connected to each other. In the state in which the first sub body 151*a* and the second sub body 151*b* are connected to each other, a bottommost portion of the first sub body 151*a* and the second sub body 151*b* may be a resin discharge hole 151*f* for discharging the resin.

The columnar hollow space defined by the columnar hollow space 151*d* of the first sub body 151*a* may assist the resin to be evenly discharged to the water tank 12. A process of spreading of the resin evenly in a width direction without gathering to a central portion of the re-coater 15 will be described below in detail with reference to FIG. 8.

The wind cover 152 may be connected to the re-coater body 151, and reduce influence of the air acting on the resin discharged from the re-coater body 151. For example, the wind cover 152 may block wind that may act on the resin as the re-coater 15 moves in a direction of an arrow or in a direction opposite the arrow. When it is defined that the direction of the arrow is a forward direction, the wind cover 152 may include a front wind cover 152*a* connected to a front portion of the re-coater body 151 to reduce influence of the air acting on the front portion of the resin, and a rear wind cover 152*b* connected to a rear portion of the re-coater body 151 to reduce influence of the air acting on the rear portion of the resin.

The wind cover 152 may assist the resin to be stably discharged in a vertically downward direction. In addition, a gap between the wind cover 152 and the resin to be discharged may be widened in the vertically downward direction. Due to such structure, the resin may not in contact with the wind cover 152 even when the resin, which is being discharged, is bent by inertia as the re-coater 15 moves at a high speed.

The wind cover 152 may be made of a translucent or transparent material. The user may observe whether the resin is smoothly discharged from the re-coater body 151 through the wind cover 152.

The guide plate 153 may be installed each of both ends of the re-coater body 151 in a width direction of the re-coater body 151 to prevent the resin discharged from the re-coater body 151 to deviate in the width direction of the re-coater body 151. The guide plate 153 may be installed at each of both ends of the resin discharge hole 151*f* in the width direction of the re-coater body 151. The guide plate 153 may be detachably connected to the re-coater body 151.

The re-coater head 154 may be connected to an upper end of the re-coater body 151, and connect the re-coater body 151 and the re-coater holder 181 with each other. The re-coater head 154 may include, for example, a plurality of head holes 154a defined therein.

A relative position of the re-coater 15 may be adjusted with respect to the re-coater holder 181 of the re-coater driver 18 (see FIG. 4). For example, the position of the re-coater 15 may be adjusted in the vertical direction along the re-coater holder 181. The re-coater 15 may be moved in the vertical direction to improve reliability and stability of a liquid film. For example, the re-coater holder 181 may include a plurality of re-coater fixing portions 181a provided in the longitudinal direction. For example, the plurality of re-coater fixing portions 181a may be holes defined through the re-coater holder 181.

The re-coater 15 may be connected to at least one of the plurality of re-coater fixing portions 181a. For example, the re-coater 15 may be fixed to the re-coater holder 181 by a re-coater fastener 155. The re-coater fastener 155 may pass through a re-coater head hole 154a and be fixed to the re-coater fixing portion 181a.

An angle between the re-coater 15 and the re-coater holder 181 of the re-coater driver 18 (see FIG. 4) may be adjusted. For example, after the user releases a fastening state of the re-coater 15 and the re-coater holder 181, and after the angle between the re-coater 15 and the re-coater holder 181 is set, the re-coater 15 and the re-coater holder 181 may be fixed through the re-coater fastener 155, so that the angle between the re-coater 15 and the re-coater holder 181 may be adjusted.

Figure 8A:
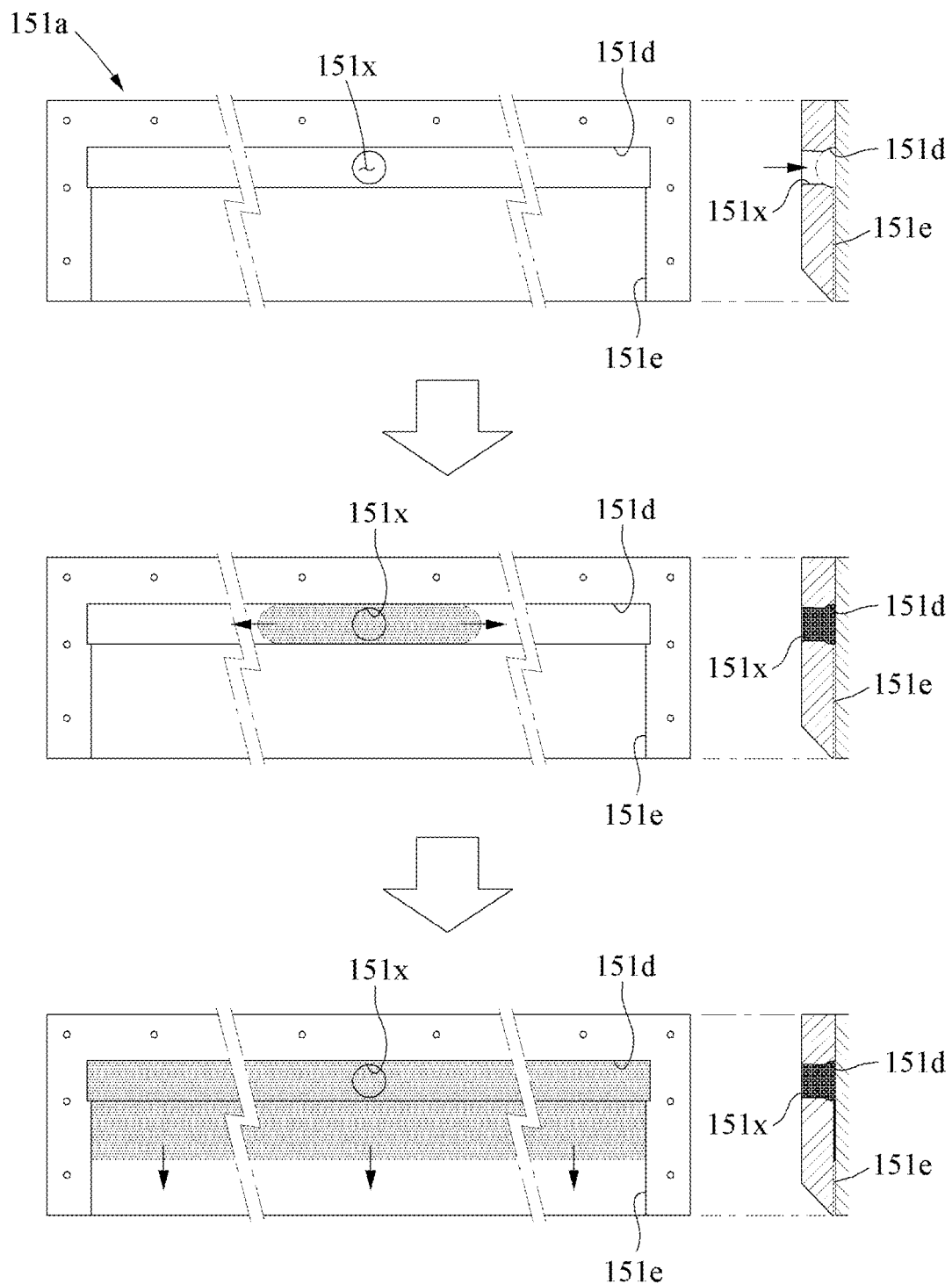
FIG. 8A is a view illustrating states of resin flowing in a re-coater body according to one embodiment in chronological order.
Figure 8B:
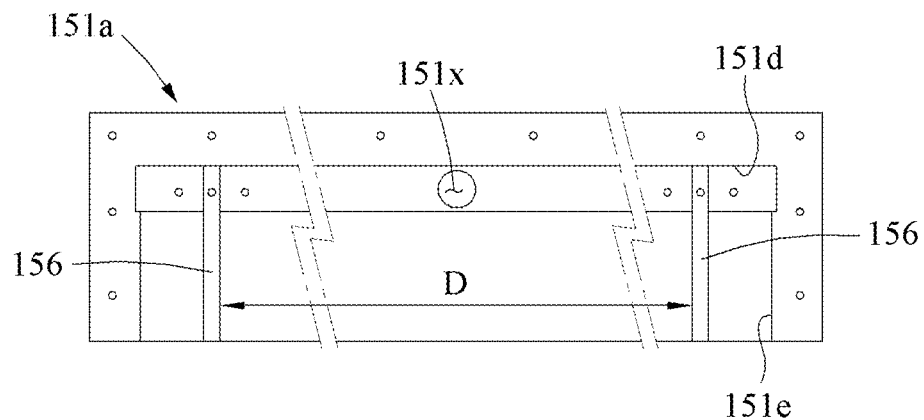
FIG. 8B is a diagram illustrating a re-coater shield according to one embodiment.

FIG. 8A is a view illustrating states of resin flowing in a re-coater body according to one embodiment in chronological order. It is noted that only the first sub body 151a of the re-coater body 151 is illustrated in FIG. 8A for convenience of description. FIG. 8B is a diagram illustrating a re-coater shield according to one embodiment.

Referring to FIGS. 8A and 8B, the resin in the re-coater body 151 may be evenly discharged in the width direction without being gathered to the central portion.

A drawing shown in the top is a view illustrating a state in which the resin is not flowed into the re-coater body 151. A drawing shown in the middle is a view illustrating a state in which the resin begins to flow into the re-coater body 151. Further, a drawing shown in the bottom is a view illustrating a state in which the resin is being discharged along the second portion 151e while the resin is fully filled in the columnar hollow space 151d of the re-coater body 151.

First, the resin may be flowed into a receiving hole 151x from the re-coater valve 158 (see FIG. 5). The resin inflowed along the receiving hole 151x may flow in the width direction along the columnar hollow space 151d having a large cross-sectional area. As a small amount of the resin flows into the receiving hole 151x, the small amount of the resin may flow directly downward. However, most of the resin may flow in the width direction along the columnar hollow space 151d. After the resin in the columnar hollow space 151d is filled, the resin may flow in the vertical downward direction along the second portion 151e. In such manner, the resin may be discharged to the water tank 12 (see FIG. 4) in a state of spreading in the width direction of the re-coater (see FIG. 5).

Referring to FIG. 8B, the re-coater may further include re-coater shields 156 connected to the re-coater body so as to be adjustable in position and for setting a magnitude of a width D of the columnar hollow space 151d of the re-coater body. For example, the re-coater shields 156 may be respectively mounted on opposite sides of the receiving hole 151x, and set the magnitude of the width D of the columnar hollow space 151d. It is noted that one re-coater shield 156 may be provided although the drawing shows that there are two re-coater shields 156. The re-coater shields 156 may block a space between the first sub body 151a and the second sub body 151b (see FIG. 7). In other words, the resin is not able to flow beyond the re-coater shield 156. The re-coater body 151 may include a plurality of fixing holes defined therein for fixing the re-coater shield 156.

Figure 9:
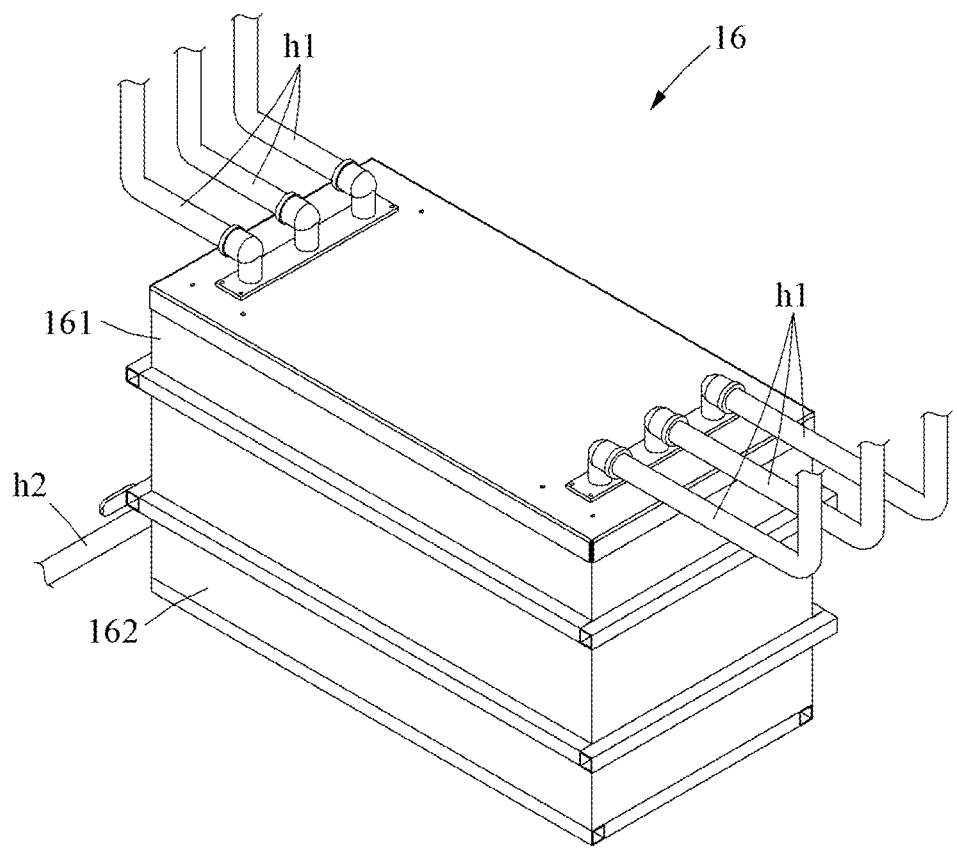
FIG. 9 is a perspective view of a resin supplier according to one embodiment.
Figure 10:
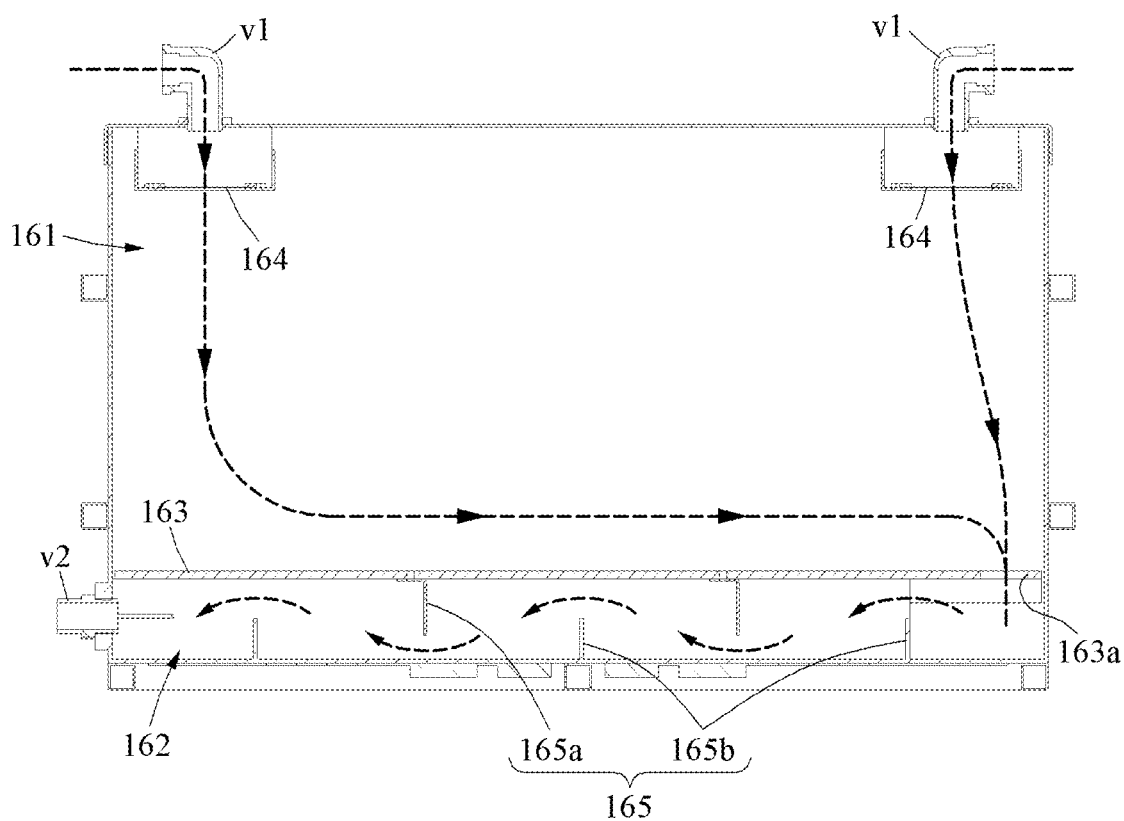
FIG. 10 is a view schematically illustrating a state of resin flowing in a resin supplier according to one embodiment.
Figure 11:
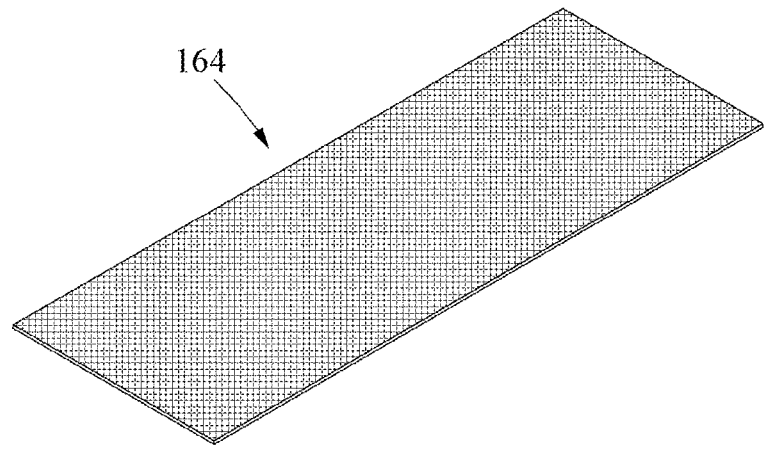
FIG. 11 is a perspective view of a mesh plate according to one embodiment.
Figure 12:
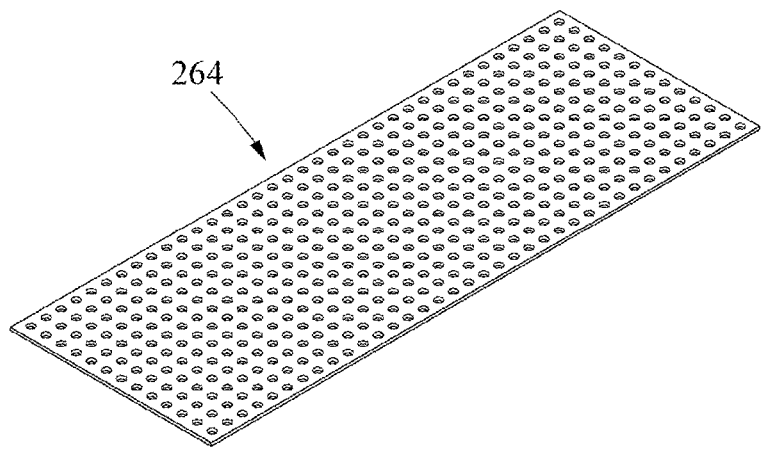
FIG. 12 is a perspective view of a mesh plate according to one embodiment.

FIG. 9 is a perspective view of a resin supplier according to one embodiment. Further, FIG. 10 is a view schematically illustrating a state of resin flowing in a resin supplier according to one embodiment. Further, FIGS. 11 and 12 are perspective views of mesh plates according to one embodiment.

Referring to FIGS. 9 to 12, the resin supplier 16 may include an upper part 161, a lower part 162, a partition plate 163, a mesh plate 164, and a filter 165.

The upper part 161 is an upper part of the resin supplier 16. Further, the upper part 161 may be a part where a resin inflow valve v1 is installed. The resin inflow valve v1 may be installed at a portion connecting the first hose h1 (see FIG. 4) with the resin supplier 16, and may fix the first hose h1.

The lower part 162 is a lower part of the resin supplier 16. The lower part 162 may be a part where a resin discharge valve v2 is installed. The resin discharge valve v2 may be installed at a portion connecting the second hose h2 (see FIG. 4) with the resin supplier 16, and may fix the second hose h2.

The partition plate 163 may be a portion partitioning the upper part 161 and the lower part 162. The partition plate 163 includes a connection flow path 163a for communicating the upper part 161 and the lower part 162 with each other. The partition plate 163 may increase a flow path of the resin flowing from the resin inflow valve v1 to the resin discharge valve v2. For example, the connection flow path 163a may be defined on the opposite side of the resin discharge valve v2. For example, in FIG. 10, the connection flow path 163a may be defined at a right end of the partition plate 163, and the resin discharge valve v2 may be formed at a left end of the lower part 162.

The mesh plate 164 is disposed at the upper part 161. The mesh plate 164 may filter impurities inflowed together with the resin through the resin inflow valve v1. The mesh plate 164 may primarily filter large impurities. FIGS. 11 and 12 illustrate various embodiments of mesh plates 164, 264. For example, the mesh plate 164 may be a fine grid plate. As another example, the mesh plate 264 may be a plate having a plurality of small holes defined therein.

The filter 165 may be disposed between the connection flow path 163a and the resin discharge valve v2, and may include a first plate 165a and a second plate 165b.

The first plate 165a may be installed on an upper face of the lower part 162 and extend downward.

The second plate 165b may be installed on a lower face of the lower part 162 and extend upward.

The first plate 165a and the second plate 165b may be arranged to cross each other along the flow path from the connection flow path 163a to the resin discharge valve v2. The resin may flow in a direction of an arrow by the first plate 165a and the second plate 165b when the resin flows along the flow path from the connection flow path 163a to the resin discharge valve v2. In other words, the resin not only flows horizontally, but also vertically. The impurities flowing together with the resin may be filtered before reaching the resin discharge valve v2 by such flow.

Figure 13:
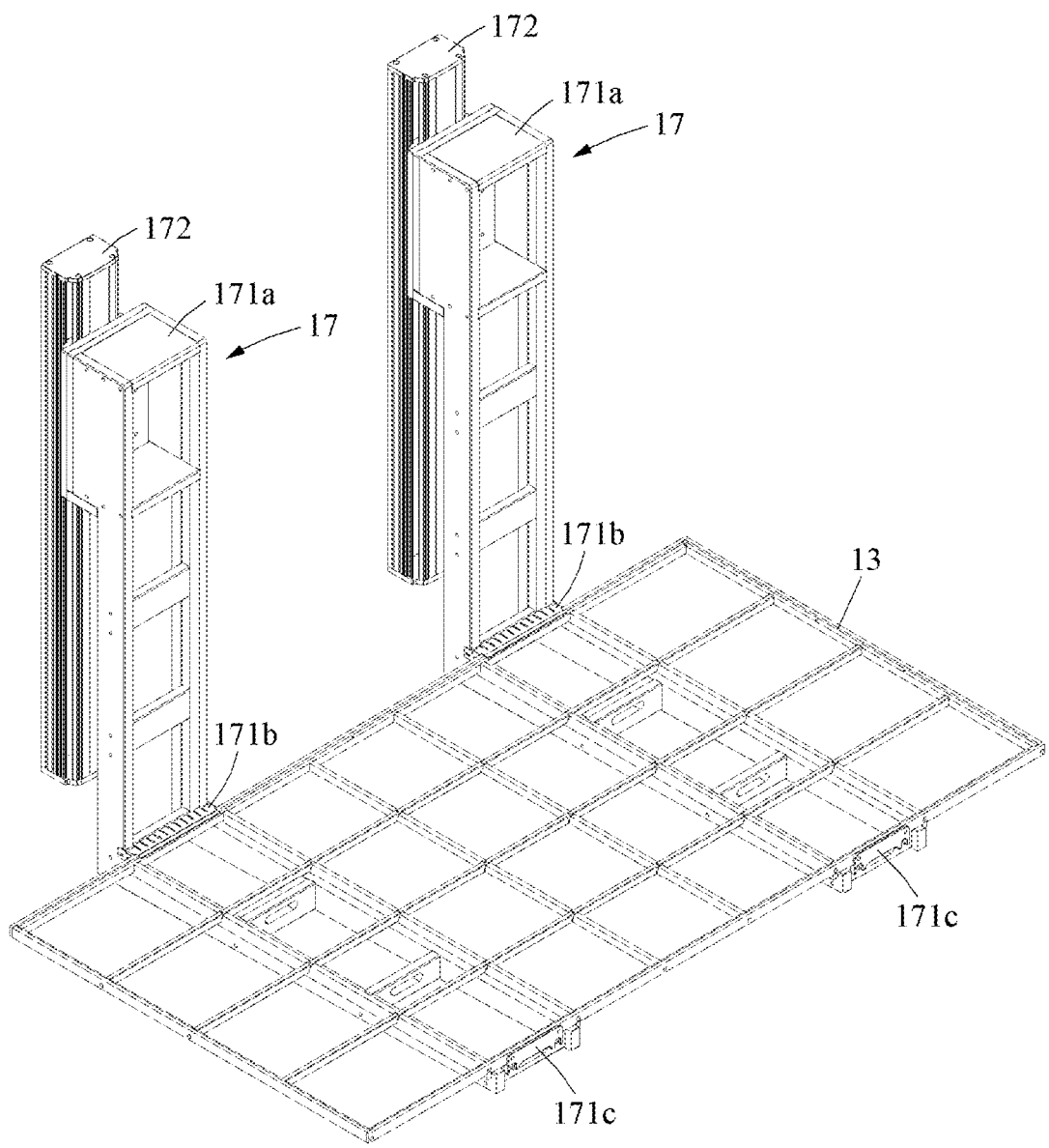
FIG. 13 is a perspective view illustrating a build platform and a build platform driver according to one embodiment.

FIG. 13 is a perspective view illustrating a build platform and a build platform driver according to one embodiment. Further, FIG. 14 is an exploded perspective view illustrating a build platform and a build platform driver according to one embodiment.

Figure 14:
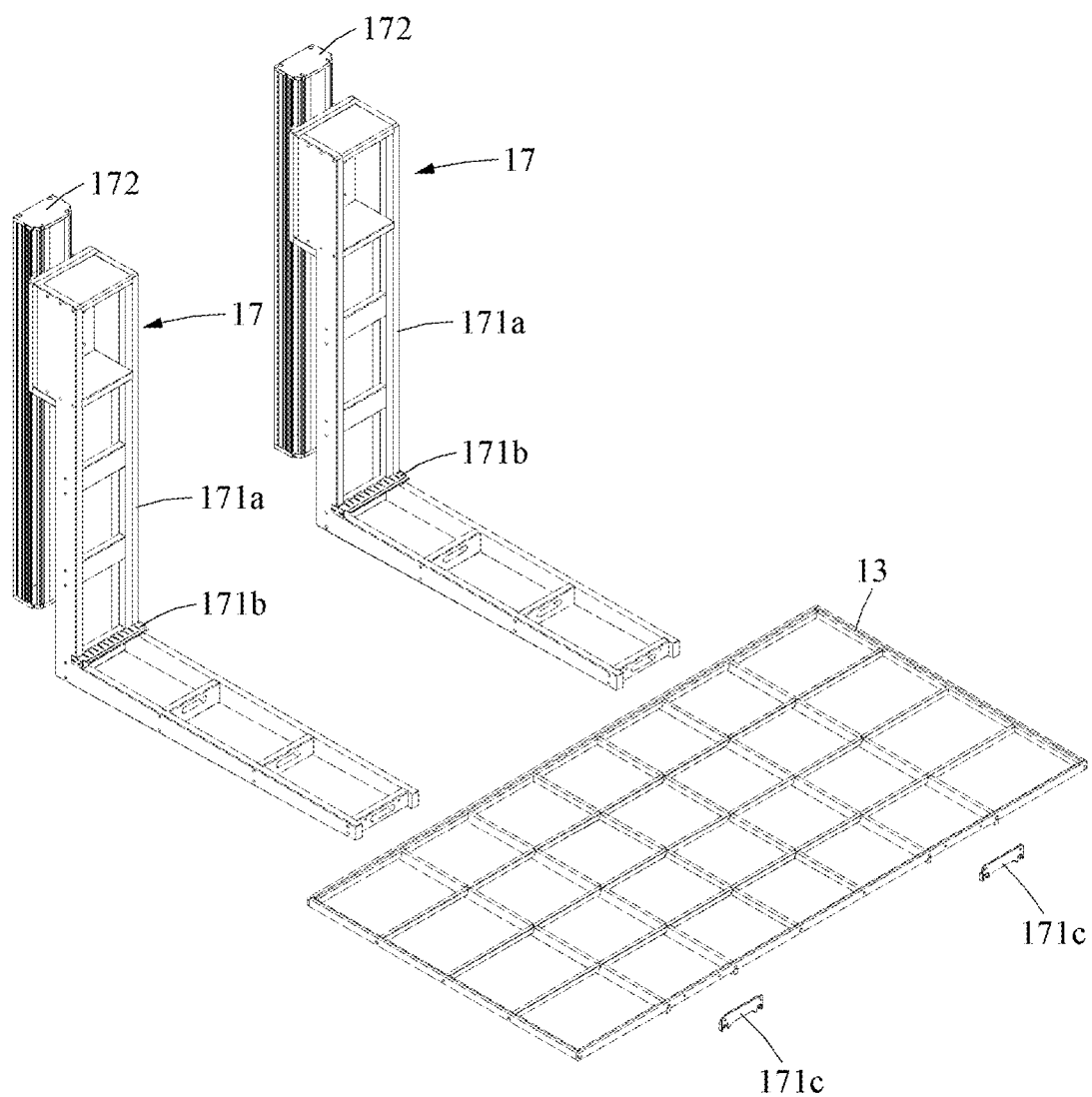
FIG. 14 is an exploded perspective view illustrating a build platform and a build platform driver according to one embodiment.

Referring to FIGS. 13 to 14, the build platform driver 17 according to an embodiment may be connected to the main frame 11 (see FIG. 1A), and may drive the build platform 13 in the vertical direction. The build platform driver 17 may include the support frame 171, the platform guide 172, and a knob 171c. In addition, the build platform driver 17 may include the drive motor (not shown) that transmits the power to the support frame 171 and/or the platform guide 172.

The support frame 171 may support the build platform 13. The support frame 171 may include, for example, a 'L' shaped base frame 171a and an elastic member 171b fixed to one side of the base frame 171a. A vertical portion of the base frame 171a may be connected to the platform guide 172, and a horizontal portion thereof may support the build platform 13. The elastic member 171b may elastically deform when being in contact with the build platform 13.

The platform guide 172 may guide a movement of the support frame 171.

The knob 171c may be mounted at one end of the support frame 171 and may prevent the build platform 13 from being separated from the support frame 171. The knob 171c may be, for example, a member fixed to the support frame 171 in surface contact with the build platform 13. For example, the knob 171c may be screwed to the support frame 171.

Figure 15A:
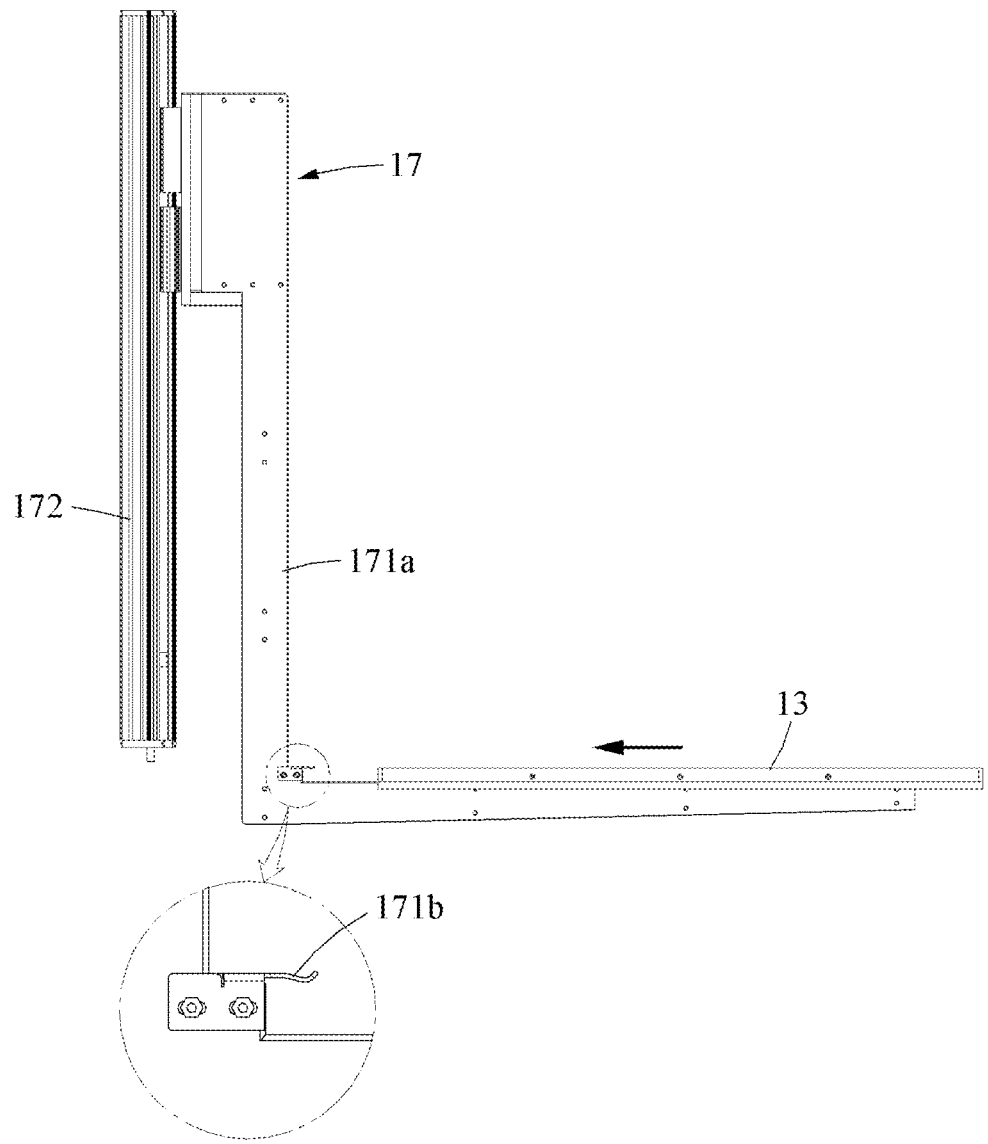
FIG. 15A is a side view illustrating a state in which a build platform according to one embodiment slides in a direction to be fastened to a build platform driver.
Figure 15B:
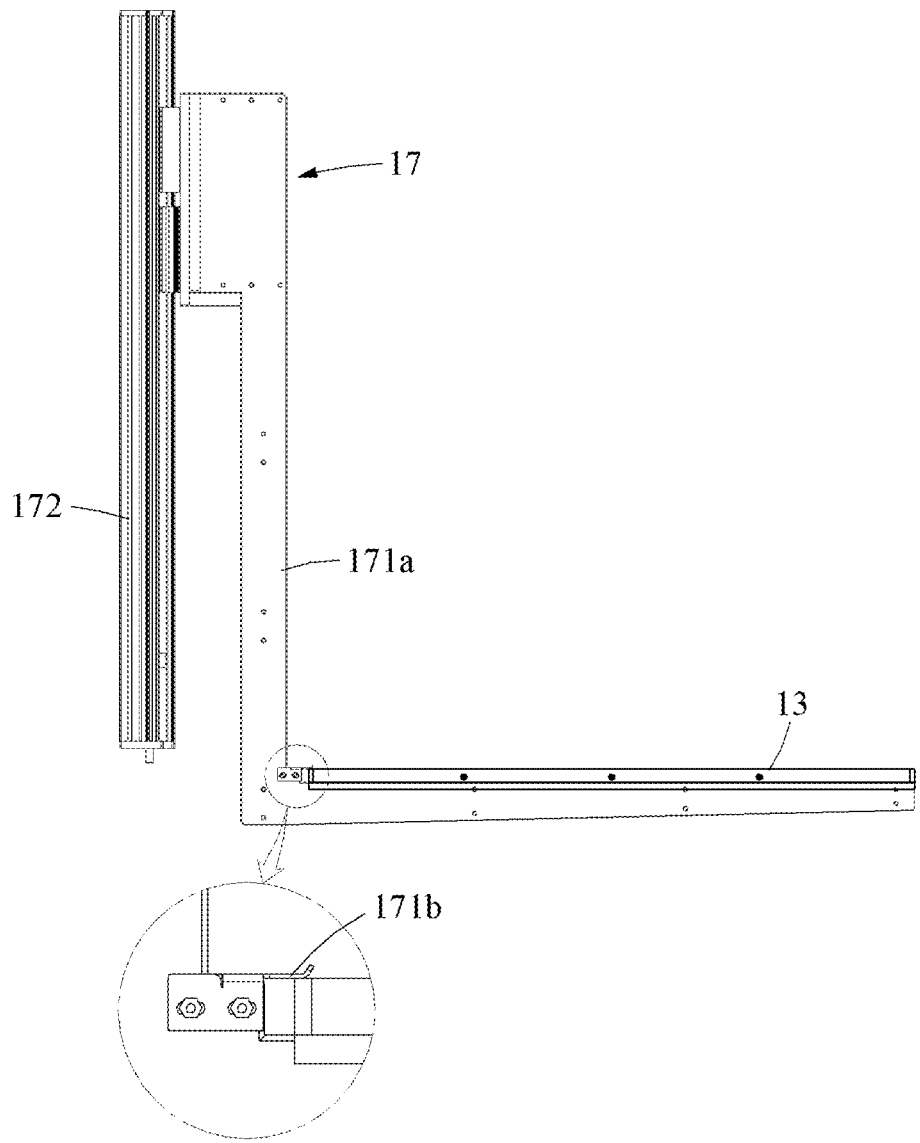
FIG. 15B is a side view illustrating a state in which an elastic member according to one embodiment is in contact with a build platform and deformed.
Figure 15C:
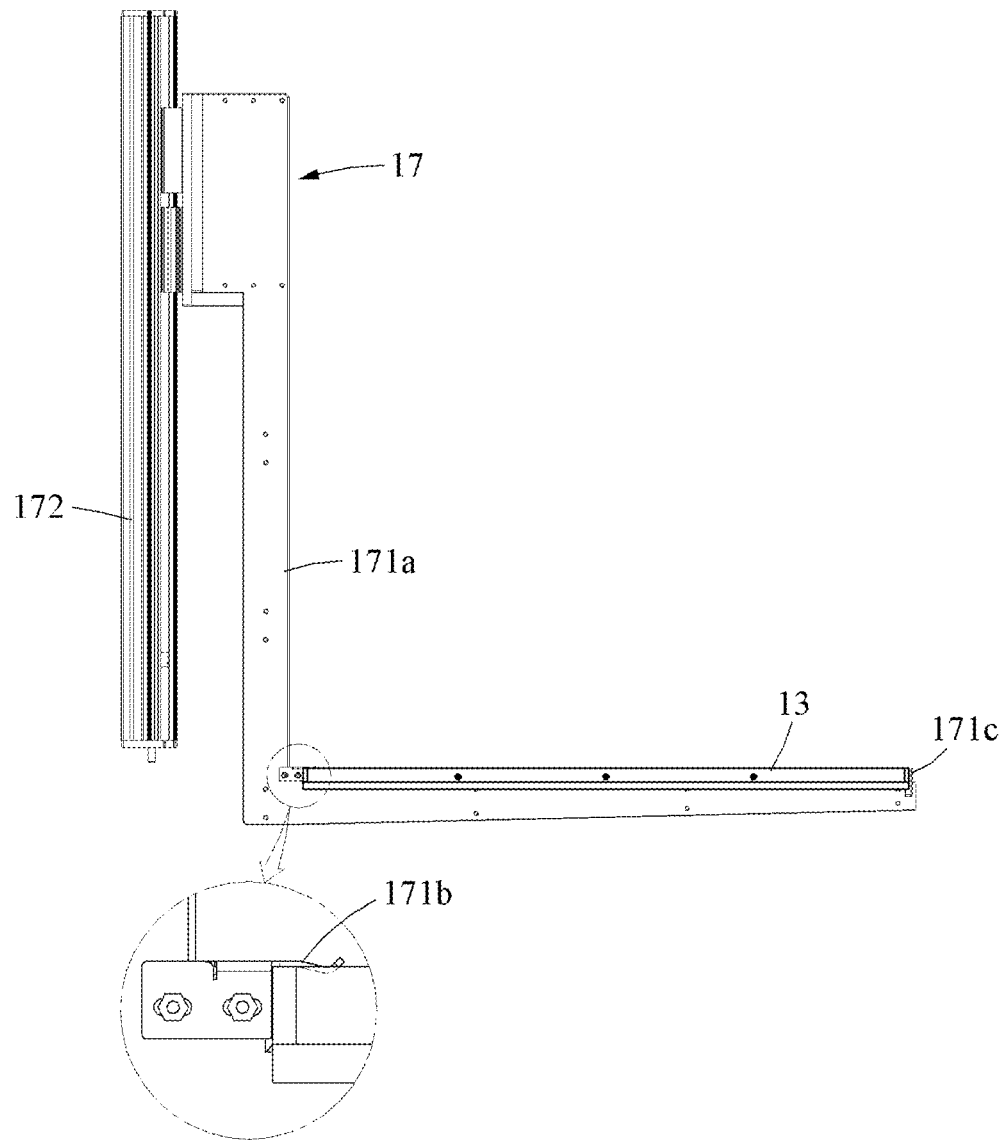
FIG. 15C is a side view illustrating a state in which a build platform according to one embodiment is fully fastened with a build platform driver.

FIG. 15A is a side view illustrating a state in which a build platform according to one embodiment slides in a direction to be fastened to a build platform driver. Further, FIG. 15B is a side view illustrating a state in which an elastic member according to one embodiment is in contact with a build platform and deformed. Further, FIG. 15C is a side view illustrating a state in which a build platform according to one embodiment is fully fastened with a build platform driver.

Hereinafter, a process in which the build platform 13 is mounted on the support frame 171 of the build platform driver 17 will be described with reference to FIGS. 15A to 15C.

FIG. 15A illustrates a state in which the build platform 13 is sliding in a left direction on the support frame 171. For example, the support frame 171 may have a longitudinal groove defined therein for guiding a linear movement of the build platform 13, and the build platform 13 may have a longitudinal protrusion formed thereon to be inserted into the longitudinal groove. Similarly, the support frame 171 may have a longitudinal protrusion formed thereon, and the build platform 13 may have a longitudinal groove defined therein.

FIG. 15B illustrates a state in which the elastic member 171b is elastically deformed by the build platform 13. The elastic member 171b may include a portion bent downward in an initial state. In this case, the build platform 13 may apply a force that deforms the elastic member 171b upwards. The elastic member 171b may be deformed upwards, and the build platform 13 may continue to move.

FIG. 15C shows a state in which the elastic member 171b is restored to the initial state again. The portion bent downward of the elastic member 171b may prevent the build platform 13 from being separated from the base frame 171a.

According to example embodiments, an 3D printer including a floating solution for reducing resin usage may dramatically reduce the initial operation cost and the use cost by containing the floating solution inside a water tank.

Further, a floating solution of an 3D printer including the floating solution for reducing resin usage may not shake significantly while a build platform descends due to a high density and high viscosity of the floating solution, thereby stably supporting the resin.

Further, when an 3D printer including a floating solution for reducing resin usage is desired to use a different type of resin, a resin replacement cost may be significantly reduced using a scheme of removing the resin and an upper portion of the floating solution contained inside a water tank to the outside, and supplying the different type of resin into the water tank.

Hereinabove, although the embodiments have been described with reference to the limited drawings, the present disclosure is not limited thereto, but may be variously modified and altered by those skilled in the art to which the present disclosure pertains. For example, appropriate results may be achieved even when the described techniques are implemented in a different order than the described method, and/or even when the described components such as the structure, apparatus, and the like are coupled or combined in a different form than the described method, or replaced or substituted by another component or equivalent.

What is claimed is:

1. A three-dimensional (3D) printer including a floating solution for reducing resin usage, the 3D printer comprising:
   a main frame;
   a water tank disposed inside the main frame;
   a build platform slidable in a vertical direction along the water tank;
   an optical assembly disposed at an upper portion of the main frame and irradiating a laser beam to the build platform;
   resin contained inside the water tank;
   the floating solution contained inside the water tank, wherein the floating solution is a defoamed floating solution, has a higher density than the resin, and is configured to support the resin, and the build platform is configured to pass through an interface between the resin and the floating solution;
   a resin supplier;
   a re-coater connected to the resin supplier and configured to discharge resin from the resin supplier onto the build platform; and
   a re-coater driver coupled to the main frame for driving the re-coater in a horizontal direction;
   wherein the re-coater driver comprises a re-coater holder configured to support the re-coater when driving the re-coater in the horizontal direction, and a relative position of the re-coater is adjustable relative to the re-coater holder;
   wherein the re-coater holder comprises a plurality of re-coater fixing portions provided to fix the re-coater, and the re-coater is connected to at least one of the plurality of re-coater fixing portions to set the relative position of the re-coater relative to the re-coater holder.

2. The 3D printer of claim 1, wherein the resin and the floating solution are separated from each other by gravity.

3. The 3D printer of claim 2, wherein the floating solution contains salt or glycerin.

4. The 3D printer of claim 3, wherein the floating solution contains equal to or more than 99% by weight of the glycerin.

5. The 3D printer of claim 1, wherein the re-coater comprises:

a re-coater body having a columnar hollow space defined in the re-coater body and a resin discharge hole connected to the columnar hollow space, wherein the re-coater is configured to discharge the resin from the columnar hollow space and through the resin discharge hole onto the build platform; and a wind cover connected to the re-coater body, and reducing influence of air acting on the resin discharged from the re-coater body.

6. The 3D printer of claim 5, wherein the re-coater further comprises:

guide plates respectively installed at both ends of the re-coater body in a width direction of the re-coater body, wherein the guide plates prevent the resin discharged from the resin discharge hole from deviating from the re-coater body in the width direction of the re-coater body.

7. The 3D printer of claim 5, wherein the re-coater further comprises:

a re-coater shield connected to the re-coater body so as to be adjustable in position, and for setting a magnitude of a width of the columnar hollow space of the re-coater body.

8. The 3D printer of claim 1, wherein an angle between the re-coater and the re-coater holder is adjustable.

9. A three-dimensional (3D) printer including a floating solution for reducing resin usage, the 3D printer comprising:

a main frame;

a water tank disposed inside the main frame;

a build platform slidable in a vertical direction along the water tank;

an optical assembly disposed at an upper portion of the main frame and irradiating a laser beam to the build platform;

resin contained inside the water tank;

the floating solution contained inside the water tank, wherein the floating solution is not mixed with the resin, has a higher density than the resin, and supports the resin;

a resin supplier;

a re-coater connected to the resin supplier and configured to discharge resin from the resin supplier onto the build platform; and a re-coater driver coupled to the main frame for driving the re-coater in a horizontal direction, wherein the re-coater comprises a re-coater body having a columnar hollow space defined in the re-coater body and a resin discharge hole connected to the columnar hollow space, and the re-coater is configured to discharge the resin from the columnar hollow space and through the resin discharge hole onto the build platform, wherein the re-coater further comprises guide plates respectively installed at both ends of the resin discharge hole in a width direction of the re-coater body, and the guide plates are configured to prevent the resin discharged from the resin discharge hole from deviating from the re-coater body in the width direction of the re-coater body.

10. The 3D printer of claim 9, wherein the re-coater further comprises:

a wind cover connected to the re-coater body, and reducing influence of air acting on the resin discharged from the re-coater body.

11. The 3D printer of claim 9, wherein a relative position of the re-coater is adjustable relative to the re-coater driver.

12. The 3D printer of claim 11, wherein the re-coater driver comprises a plurality of re-coater fixing portions provided to fix the re-coater, and wherein the re-coater is connected to at least one of the plurality of re-coater fixing portions.

13. The 3D printer of claim 9, wherein an angle between the re-coater and the re-coater driver is adjustable.

14. The 3D printer of claim 9, wherein the re-coater further comprises:

a re-coater shield connected to the re-coater body so as to be adjustable in position, and for setting a magnitude of a width of the columnar hollow space of the re-coater body.

* * * * *